US009519399B1

(12) United States Patent
Goodale et al.

(10) Patent No.: US 9,519,399 B1
(45) Date of Patent: Dec. 13, 2016

(54) PROVIDING A VISUAL INDICATION THAT STORED CONTENT IS ASSOCIATED WITH A COLLABORATION ENVIRONMENT

(75) Inventors: Andrew Goodale, Boston, CA (US); Andrew Kleppner, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 1780 days.

(21) Appl. No.: 11/370,296

(22) Filed: Mar. 7, 2006

(51) Int. Cl.
*G06F 3/0482* (2013.01)
*H04L 29/08* (2006.01)

(52) U.S. Cl.
CPC ............ *G06F 3/0482* (2013.01); *H04L 67/00* (2013.01)

(58) Field of Classification Search
USPC .................................................. 715/530, 758
See application file for complete search history.

(56) References Cited

U.S. PATENT DOCUMENTS

| | | | |
|---|---|---|---|
| 5,107,443 A | | 4/1992 | Smith et al. |
| 5,793,365 A | * | 8/1998 | Tang et al. ..................... 715/758 |
| 5,930,801 A | | 7/1999 | Falkenhainer et al. |
| 5,956,715 A | | 9/1999 | Glasser et al. |
| 6,233,600 B1 | | 5/2001 | Salas et al. |
| 6,311,269 B2 | | 10/2001 | Luckenbaugh et al. |
| 6,505,300 B2 | | 1/2003 | Chan et al. |
| 6,557,013 B1 | | 4/2003 | Ziff et al. |
| 6,564,246 B1 | | 5/2003 | Varma et al. |
| 6,671,695 B2 | | 12/2003 | McFadden |
| 7,003,502 B1 | | 2/2006 | Wizdo et al. |
| 7,031,957 B2 | * | 4/2006 | Harris ........................... 707/608 |
| 7,124,101 B1 | | 10/2006 | Mikurak |
| 7,130,807 B1 | | 10/2006 | Mikurak |
| 7,139,973 B1 | | 11/2006 | Kirkwood et al. |
| 7,139,999 B2 | | 11/2006 | Bowman-Amuah |
| 7,149,698 B2 | | 12/2006 | Guheen et al. |
| 7,162,504 B2 | | 1/2007 | McCauley et al. |
| 7,165,041 B1 | | 1/2007 | Guheen et al. |
| 7,167,844 B1 | | 1/2007 | Leong et al. |
| 7,191,397 B2 | | 3/2007 | Brooke et al. |
| 7,236,966 B1 | | 6/2007 | Jackson et al. |
| 7,236,975 B2 | | 6/2007 | McCauley et al. |

(Continued)

OTHER PUBLICATIONS

Ming-Ju Yang, Wen-Chung Chang, Win-Jet Luo, Shou-Ping Hsu, Kao-Feng Yarn, Tsung-Chan Cheng, and Po-Chun Yang, "A User-Friendly Web Content Management System", Innovative Computing Information and Control, 20008. ICICIC '08. 3$^{rd}$ International Conference on Jun. 18-20, 2008 pp. 367-367 Digital Object Identifier 10.1109/ICICIC.2008.102.

(Continued)

*Primary Examiner* — Jeffery A Gaffin
*Assistant Examiner* — Mandrita Brahmachari
(74) *Attorney, Agent, or Firm* — Van Pelt, Yi & James LLP

(57) ABSTRACT

Providing visual indication that an item of content is associated with a collaboration environment is disclosed. It is determined that a set of content items comprising one or more items of content comprising a body of managed content are to be displayed to a user. In the event that a collaboration content item included in the set of content items is associated with a collaboration environment of which the user is a member, visual indication is provided that the content item is associated with the collaboration environment.

17 Claims, 8 Drawing Sheets

(56) References Cited

U.S. PATENT DOCUMENTS

| | | | |
|---|---|---|---|
| 7,236,989 B2 | 6/2007 | McCauley et al. | |
| 7,236,990 B2 | 6/2007 | McCauley et al. | |
| 7,240,076 B2 | 7/2007 | McCauley et al. | |
| 7,246,138 B2 | 7/2007 | McCauley et al. | |
| 7,254,836 B2 | 8/2007 | Alkove et al. | |
| 7,260,584 B2 | 8/2007 | Hailey et al. | |
| 7,287,218 B1 | 10/2007 | Knotz et al. | |
| 7,296,296 B2 | 11/2007 | Dunbar et al. | |
| 7,315,826 B1 | 1/2008 | Guheen et al. | |
| 7,403,901 B1 | 7/2008 | Carley et al. | |
| 7,415,478 B2 | 8/2008 | Owen et al. | |
| 7,415,484 B1 | 8/2008 | Tulkoff et al. | |
| 7,433,896 B2 | 10/2008 | Owen et al. | |
| 7,440,863 B2 | 10/2008 | Manfredi | |
| 7,512,578 B2 | 3/2009 | Abnous et al. | |
| 7,702,730 B2* | 4/2010 | Spataro et al. | 709/205 |
| 7,752,258 B2 | 7/2010 | Lewin et al. | |
| 2002/0194485 A1 | 12/2002 | Ram et al. | |
| 2004/0111423 A1* | 6/2004 | Irving et al. | 707/100 |
| 2004/0239700 A1 | 12/2004 | Baschy | |
| 2005/0039034 A1 | 2/2005 | Doyle et al. | |
| 2005/0182641 A1 | 8/2005 | Ing et al. | |
| 2005/0262099 A1* | 11/2005 | Manfredi et al. | 707/10 |
| 2006/0080316 A1 | 4/2006 | Gilmore et al. | |
| 2006/0101017 A1 | 5/2006 | Eder | |
| 2006/0265375 A1 | 11/2006 | Hess | |
| 2007/0204078 A1 | 8/2007 | Boccon-Gibod et al. | |

OTHER PUBLICATIONS

M.C. D'Ornellas, "Applying Digital Rights Management to Complex Content Management Systems", Computational Science and Engineering, 2008. CSE '08. 11$^{th}$ IEEE International Conference on Jul. 16-18, 2008 pp. 429-435 Digital Object Identifier 10.1109/CSE.2008.64.

J. Souer and M. Van Mierloo. "A Component Based Architecture for Web Content Management: Runtime Deployable WebManager Component Bundles", Web Engineering, 2008. ICWE '08. Eighth International Conference on Jul. 14-18, 2008 pp. 366-369 Digital Identifier 10.1109/ICWE.2008.32.

Sung Ho Jang, Chang Hyeon Noh, and Jong Sik Lee, "Semantic Web-Based Digital Content Management in Grid Computing" Semantic Computing and Applications, 2008. IWSCA-'08. IEEE International Workshop on Jul. 10-11, 2008 pp. 129-131 Digital Object Identifier 10.1109/IWSCA.2008.8.

O-Hoon Choi, Jung-Eun Lim, Dong-Hyun Lee, Hong-Seok Na, and DOO-Kwon Baik, "A multimedia contents management system based on a metadata-net in home network" Consumer Electronics, IEEE Transactions on vol. 54, Issue 2, May 2008 pp. 468-473 Digital Object Identifier 10.1009/TCE.2008.4560116.

W. Harrison, "Content Mismanagement Systems" Software, IEEE vol. 23, Issue 1, Jan.-Feb. 2006 pp. 5-8 Digital Object Identifier 10.1109/MS.2006.7.

M. Grossniklaus, M.C. Norrie, B. Signer, and N. Weibel, "Producing Interactive Paper Documents Based on Multi-Channel Content Publishing", Automated Production of Cross Media Contect for Multi-Channel Distribution, 2007. AXMEDIS '07. Third International Conference on Nov. 28-30, 2007 pp. 89-96 Digital Object Identifier 10.1109/AXMEDIS.2007.22.

Feng-Hsu Wang, "A Contextualization Method of Browsing Events in Web-based Learning Content Management System for Personalized Learning", Advanced Learning Technologies, 2007. ICALT 2007. Seventh IEEE International Conference on Jul. 18-20, 2007 Digital Object Identifier 10.1109/ICALT.2007.9.

"KBMS-Prototype KRISYS usermanual overview" KBMS-Prototype KRISYS User Manual, Dec. 1, 1992, pp. 1-94, XP002193794.

Mattos N M et al.: "Grand tour of concepts for object-orientation from a database point of view" Data & Knowledge Engineering, Amsterdam, NL, vol. 9, No. 3, Jan. 1, 1992, pp. 321-352, XP009020749.

Bertino E et al.: "Object-Oriented Database Management Systems: Concepts and Issues" Computer, IEEE Service Center, Los Alamitos, CA US, vol. 24, No. 4, Apr. 1, 1991, pp. 33-47, XP000227753 ISSN: 0018-9162.

* cited by examiner

PROVIDING A VISUAL INDICATION THAT STORED CONTENT IS ASSOCIATED WITH A COLLABORATION ENVIRONMENT

BACKGROUND OF THE INVENTION

A useful aspect of content management systems is the functionality that is built into the content management system including being able to apply uniform policies over all the content managed by the system (for example, access, retention services, searching services, version control, backup, etc.). However, the ability for these services to provide to all users of the body of managed content access all the content under management can be problematic. For example, using a global search in some cases shows the existence of documents that should be kept hidden from at least some users (for example, a reduction in force plan, a merger or acquisition proposal, etc.), e.g., by limiting access to those collaborating to create and/or finalize the documents. In some cases, it would be useful for a subset of one or more users to be able to take advantage of the capabilities of the content management system with regard to accessing a specific set of content items or objects where all other users could not. It would also be useful for members of the subset to have an easy way of identifying content items or objects to which the user has access by virtue of their being included in the specific set of content items and his/her membership in a subset of users having exclusive access to the content items or objects comprising the specific set.

BRIEF DESCRIPTION OF THE DRAWINGS

Various embodiments of the invention are disclosed in the following detailed description and the accompanying drawings.

DETAILED DESCRIPTION

Figure 1:
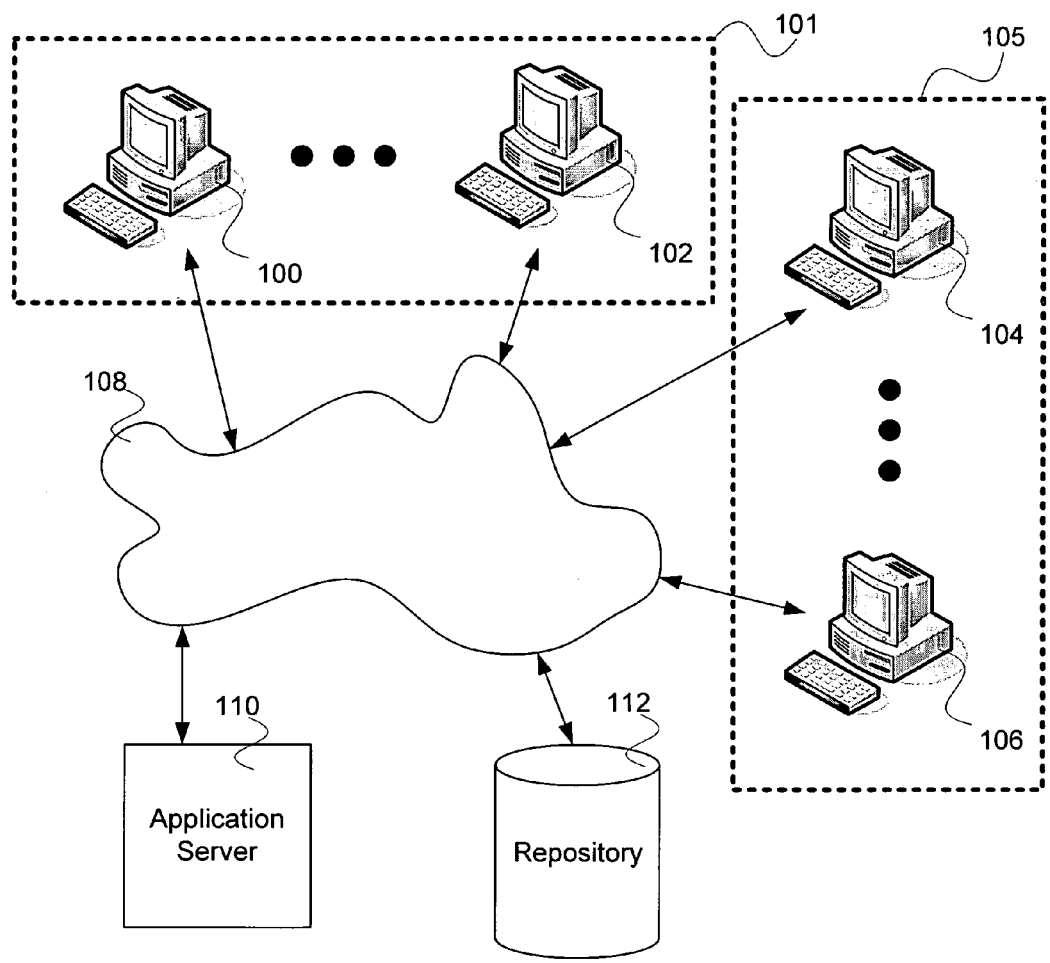
FIG. 1 is a block diagram illustrating an embodiment of a system for associating stored content with a collaboration environment.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing a visual indication that a content item comprising a body of managed content is associated with a collaboration space is disclosed. An indication is received from a user to view content included in a body of managed content. In the event that an otherwise responsive content item comprising the body of managed content is also associated with a collaboration environment and that the user is a member of the collaboration environment, a visual indication that the content item is associated with the collaboration environment is provided. In some embodiments, a member of a collaboration environment upon browsing a body of managed content sees a visual indication (for example, a variation or addition to an icon representing a content item or object) that a stored object is associated with a collaboration environment. In some embodiments/circumstances, the indication identifies the collaboration environment (e.g., the particular "eRoom") to which the object pertains. The indication enables a member to distinguish between objects owned exclusively by the collaboration environment and, therefore, not visible to outsiders, or non-members, and other objects that a non-member user of the body of managed content would be able to see. If browsing within the collaboration environment, the indication would enable a member to distinguish between objects owned exclusively by the collaboration environment and "shared" objects to which a link is provided in the environments that would be visible to others. In some embodiments, a non-member browsing outside the environment would not see objects that are associated with a collaboration space, and further a non-member cannot browse the collaboration environment because the collaboration environment is not visible to non-members. In some embodiments, in event that the collaboration content item is associated with a collaboration environment of which the user is not a member, providing visual indication that the content item is associated with the collaboration environment by providing no visual indication of the collaboration content item to the user.

FIG. 1 is a block diagram illustrating an embodiment of a system for associating stored content with a collaboration environment. In the example shown, users that are members of a collaboration use a computer or terminal, represented in FIG. 1 by the group 101 including a set of collaboration member computers represented in FIG. 1 by computers 100 and 102, to interact with a content management system configured to associate stored content with a collaboration environment and limiting viewing and/or manipulation of such stored content to users involved in the collaboration, sometimes referred to herein as "members" of the collaboration. In this example, users that are not members of the collaboration, but who are users authorized to access at least some content stored in repository 112, use a computer or terminal, represented in FIG. 1 by the group 105 including a set of non-member user computers represented in FIG. 1 by computers 104 and 106, to interact with the same content management system as member computers 100 and 102, except that the non-members users associated with computers 104 and 106 cannot view or otherwise access or use content items that have been associated with the collaboration environment of which they are not members. While in this example members and non-members used different computers, in other embodiments members and non-members may use the same computers or different computers, and in either case the content items accessible by a user include only those items either not governed by—i.e., associated exclusively with—a collaboration environment or items governed by a collaboration environment of which the user is a member, e.g., based on the user's username and/or password or other identifying information. Computers 100, 102, 104, and 106 are coupled to network 108 and interact via network 108 with application server 110 and repository 112 comprising the content management system. In various embodiments, network 108 includes one or more of the Internet, a local area network, a wide area network, a wired network, a wireless network, and any other network that can enable a user to access stored system content. Application server 110 includes applications that are used when accessing content stored in repository 112. Application server 110 also includes applications used for creating, maintaining, and operating a collaboration environment. A collaboration environment allows the owners to define roles and the rights those roles convey—for example, an owner role allowing reading, writing, annotating, editing, and deleting; and a contributor role allowing reading and annotating. In some embodiments, a collaboration environment comprises a virtual workspace in which members can, based on assigned privileges, collaborate for work including accessing, modifying, reviewing, authorizing, approving, and/or removing content stored on repository 112. In some embodiments, only members can view and access content associated with the collaboration environment. In some embodiments, application server 110 and repository 112 comprise a content management system. In various embodiments, application server 110 comprises one or more processors, one or more memories, and one or more storage devices and can be implemented using one or more physical box units. In various embodiments, repository 112 comprises one or more storage devices and/or one or more processors or one or more memories and can be implemented using one or more physical box units. In some embodiments, application server 110 and repository 112 are combined in one physical unit or system.

Figure 2:
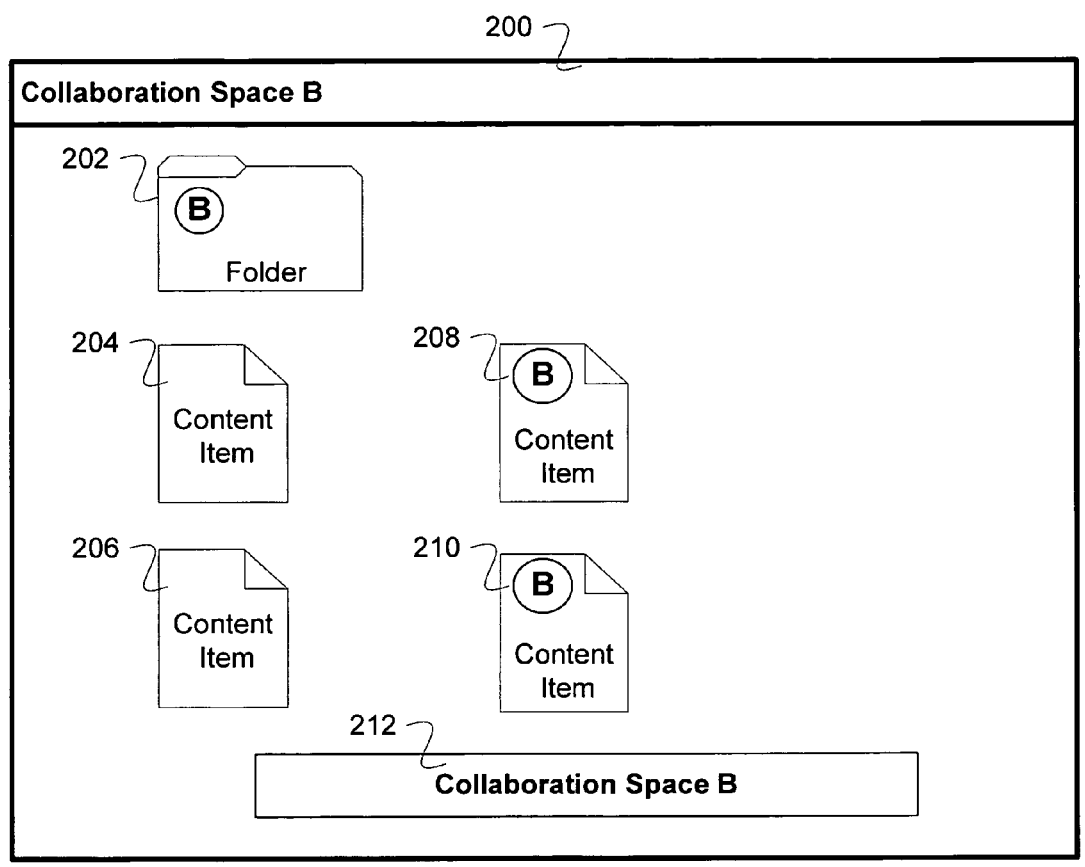
FIG. 2 is a block diagram illustrating one embodiment of items in a collaboration space.

FIG. 2 is a block diagram illustrating one embodiment of items in a collaboration space. In the example shown, window 200 displays content items and/or other information associated with a virtual collaboration space B. In some embodiments, window 200 is displayed when a member of collaboration space B, such as a user using computer 100 or computer 102 of FIG. 1, views collaboration space B, e.g., by navigating to and/or otherwise selecting or accessing a folder, link, menu option, etc. associated with collaboration space B. Window 200 contains displays of content—for example, content item 208 and content item 210, or a group of content or folder—for example folder 202 associated with collaboration space B. In the example shown, content item 204 and content item 206 are associated with collaboration B, but are shared and so are not exclusively governed by the rules of collaboration space B. In some embodiments, content items that are governed by collaboration space rules are not necessarily displayed in window 200 at all times window 200 is open. For example, only a subset of content items governed by or otherwise associated with the collaboration space, such as those being used at a given point in time and/or those needed by and/or allowed to be viewed by the particular user, e.g., based on the user's role, are displayed to that user. In some embodiments, content items that are governed by collaboration space rules are only visible to collaboration space members, sometime referred to herein as "room members," even if they are not currently displayed in window 200 to a room member and/or even when accessed other than through the room'interface (window 200 in this example), e.g., by searching or browsing the broader body of content in which content items governed by the room are stored. In some embodiments, items that are governed by collaboration space rules are indicated visually—for example, with a symbol, a variation of the icon, and/or a change in the icon. Banner 212 identifies window 200 as being associated with collaboration environment B. In some embodiments, there is no banner 212 identifying window 200 as being collaboration environment B.

Figure 3:
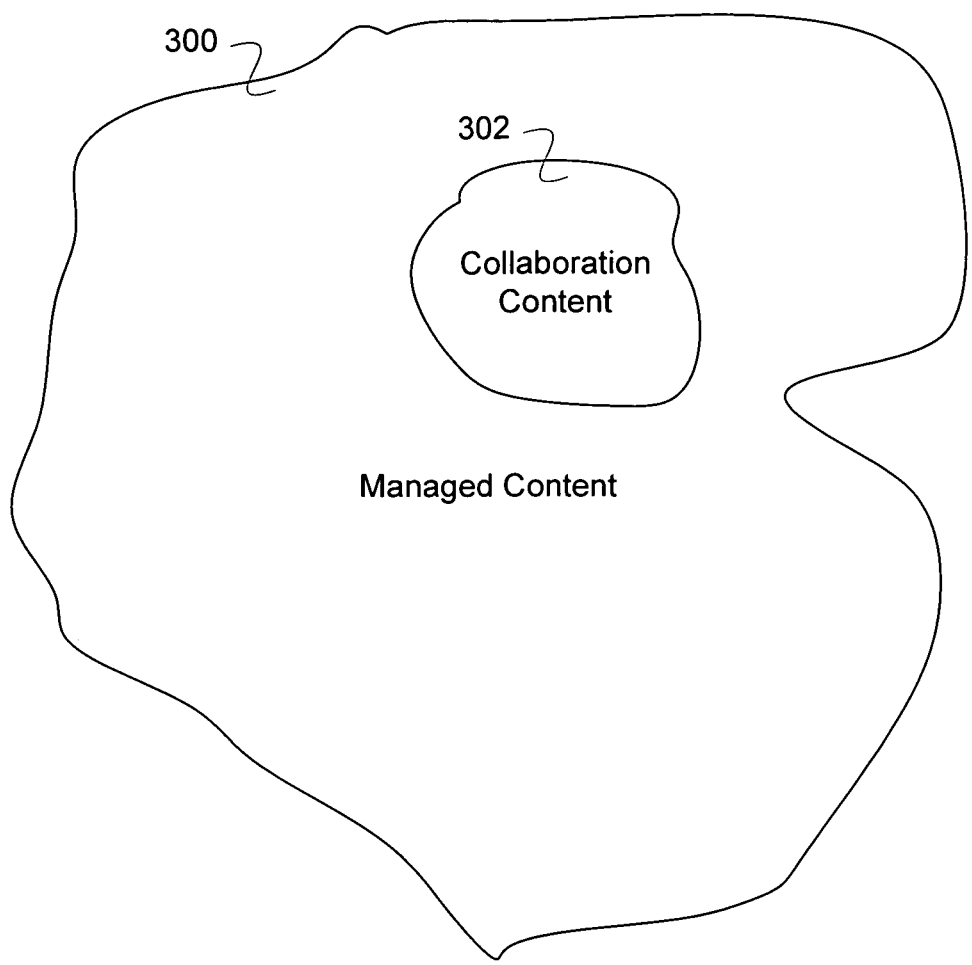
FIG. 3 is a block diagram illustrating an example of collaboration content included in a broader body of managed content.

FIG. 3 is a block diagram illustrating an example of collaboration content included in a broader body of managed content. In the example shown, managed content 300 comprises content that is associated with system such as the system in FIG. 1. In some embodiments, the system is a content management system. In some embodiments, managed content 300 comprises content that is managed by a content management system with functionality such as retention services, search services, security services, etc. Collaboration content 302 is a subset of managed content 300. Collaboration content 302, once associated exclusively with a collaboration space, is not visible or accessible to nonmembers of the collaboration space. A collaboration space allows the members to work on documents (or other content items) that are part of collaboration content 302 without the documents appearing or being able to be accessed by any application (for example, system wide search) or system user (for example, an executive at another location) other than a member of the collaboration space whose role allows that member to view/access the document. In some embodiments, a collaboration space is created to hold content which members collaborate on in a secure environment (for example, an environment for working on a set of documents involving a merger or acquisition, a reduction in force, a restructuring, etc.); to provide security, retention policy, and/or other content management services with respect to such content; and/or to provide a framework for implementing content-related business processes, such as content generation, review, and approval. Placing content under the governance of a collaboration environment does not remove the governance of other content management features (for example, life cycle state, workflow state, retention policy). In some embodiments, placing content under the governance of a collaboration environment does remove the governance of other management features.

Figure 4:
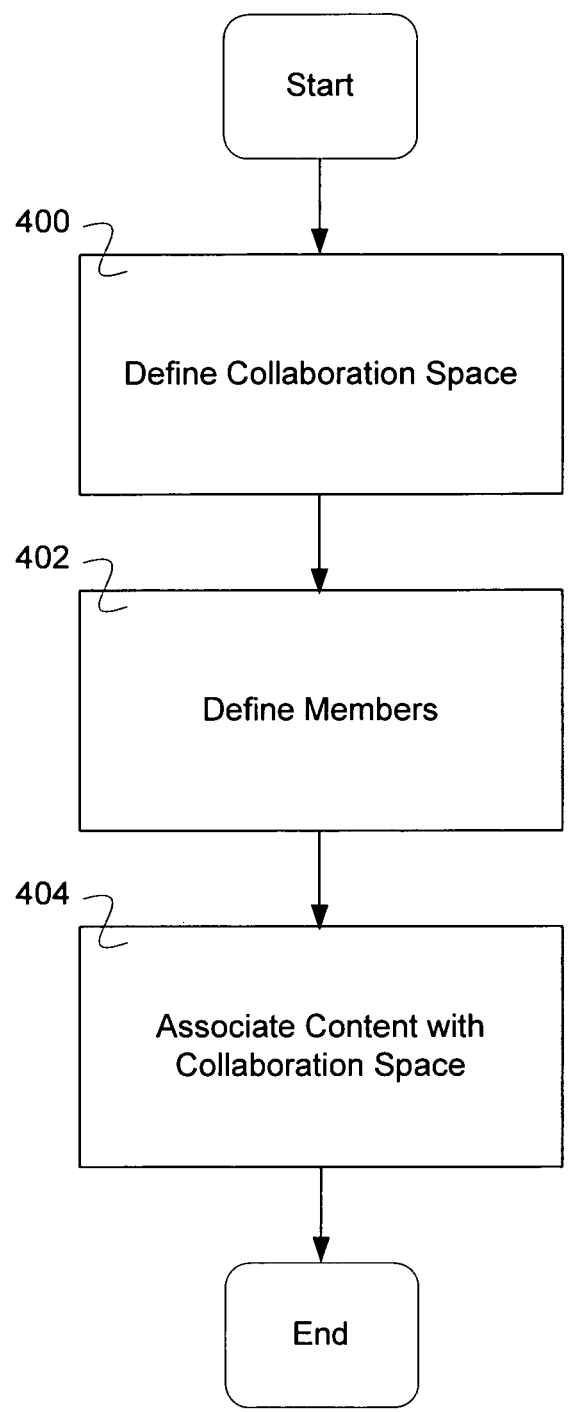
FIG. 4 is a flow diagram illustrating an embodiment of a process for associating stored content with a collaboration environment.

FIG. 4 is a flow diagram illustrating an embodiment of a process for associating stored content with a collaboration environment. In the example shown, in 400 a collaboration space is defined. In some embodiments, a collaboration space is created in a repository, e.g., by designating and/or configuring a physical or logical storage location, such as a folder, an 'eRoom,' a directory, etc., to store and/or otherwise manage content associated with the collaboration environment. In 402, members of the collaboration are defined. Members are defined for the collaboration in various ways including by entering a list, by clicking on icons representing an individual user or a group of users, by highlighting users in a list, using pull down menus, or any other way in which one or more users can be indicated to be members. In some embodiments, member rights and privileges are selected in 402. In various embodiments, member rights are selected by individually assigning members' rights such as read, write, edit, delete, approval, and/or other rights and privileges, by using a default setting for roles, or by assigning a role to a member where the role has rights and privileges associated with it. In 404, content is associated with the collaboration space. Content is associated with the collaboration space in various ways including creating documents in the collaboration space, saving documents to the collaboration space, dragging and dropping documents into the collaboration space, or any other way of populating the collaboration space.

Figure 5:
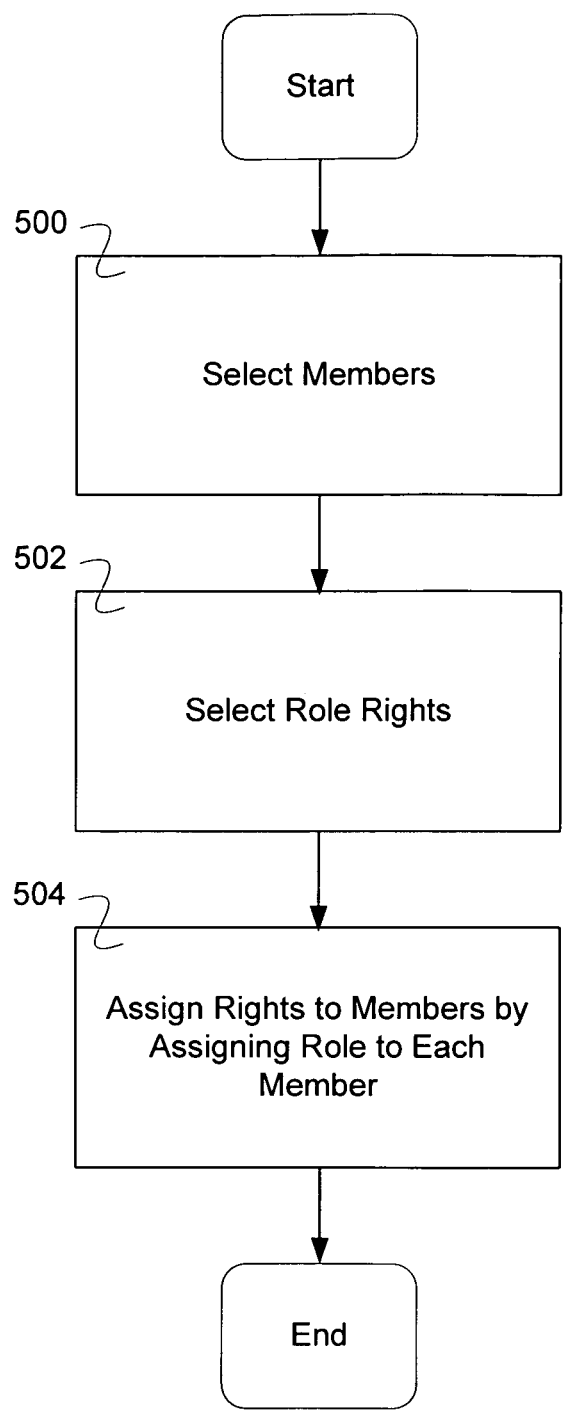
FIG. 5 is a flow diagram illustrating an embodiment of a process for defining members of a collaboration space.

FIG. 5 is a flow diagram illustrating an embodiment of a process for defining members of a collaboration space. In some embodiments, the process of FIG. 5 implements 402 of FIG. 4. In the example shown, in 500 members are selected. One or more members are selected by indicating (for example, programmatically by a server/application or interactively by a user) that a system user is to be part of the collaboration environment. In some embodiments, indicating that a user is to be part of a collaboration environment includes listing a user in a user interface that is part of a setup application for the collaboration space such as a collaboration space setup wizard. In some embodiments, the user is notified by email, by text message, or by another notification mechanism, that they are a member in a collaboration environment. In 502 role rights are selected. Roles are defined with associated rights. Roles can include owner, administrator, contributor, observer, read-only, coordinator, approver, manager, editor, etc. Rights associated with a role can include rights to read, modify, delete, create, copy, write, approve, etc. In 504, rights are assigned to members by assigning a role to each member. Each member is granted the rights that have been associated with the role.

Figure 6:
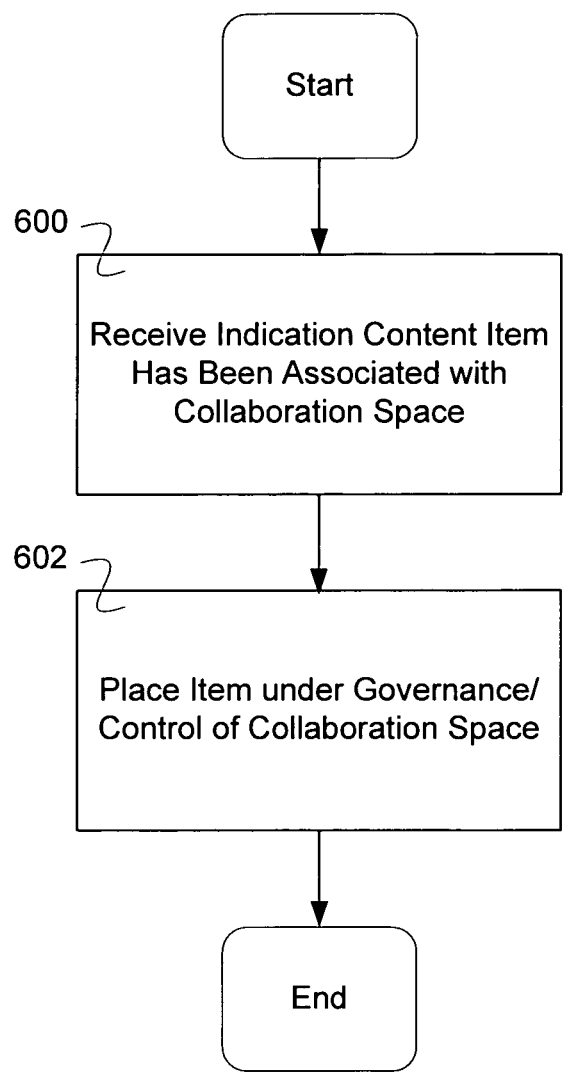
FIG. 6 is a flow diagram illustrating an embodiment of a process for associating content with a collaboration space.

FIG. 6 is a flow diagram illustrating an embodiment of a process for associating content with a collaboration space. In some embodiments, the process of FIG. 6 implements 404 of FIG. 4. In the example shown, in 600 an indication is received that a content item has been associated with a collaboration space. The indication that a content item is associated with a collaboration space can be achieved in various ways including dragging an icon associated with a document into the collaboration window, listing a document in a user interface window during the setup of the collaboration space, selecting a content item using a menu, clicking on content items in a window, or any other appropriate way of indicating that content is associated with a collaboration space. In some embodiments, in response to an indication received at 600 the applicable item(s) of content are linked to a logical folder associated with the collaboration environment. Linking the items to the folder makes the items accessible to authorized users, e.g., members of the collaboration environment, and in some embodiments invokes and applies to the item(s) of content methods that render the item(s) invisible to non-members and/or members whose assigned role, individual user identity, etc. does not entitle them to access the item(s). In some embodiments, shared content items associated with the collaboration environment—e.g., items linked to and desired to be readily accessible via the environment but not to the exclusion of non-members—remain accessible to non-members even though they are also associated with an accessible via the collaboration environment. In 602, the item is placed under governance/control of a collaboration space. In some embodiments, 602 includes selectively placing under exclusive control or "governance" of the collaboration space only those items associated with the collaboration space for which such exclusive control has been requested or indicated. Once the item is placed under control of the collaboration space visibility of the content item, access to the item by applications and users, and rights for users as applied to the content are governed entirely by the collaboration space. For example, visibility and access can be completely denied to users and applications run by users who are not members of the collaboration space. In some embodiments, for example, a content item under collaboration space governance which content item is otherwise responsive to a content search performed by a non-member will not be included in search results as returned to the non-member. Likewise, in some embodiments, a content item under collaboration space governance will not be displayed to a non-member user who has navigated to a non-collaboration associated folder in which the item resides and/or to which the item is linked. In some embodiments, a content item under collaboration space governance will be displayed to a non-member user, and a visual indication is given that the content item is not accessible to the non-member user. In some embodiments, a first visual indication is given if a content item is associated with a collaboration environment and not governed by the collaboration environment, and a second visual indication is given if a content item is associated with a collaboration environment and governed by the collaboration environment.

Figure 7:
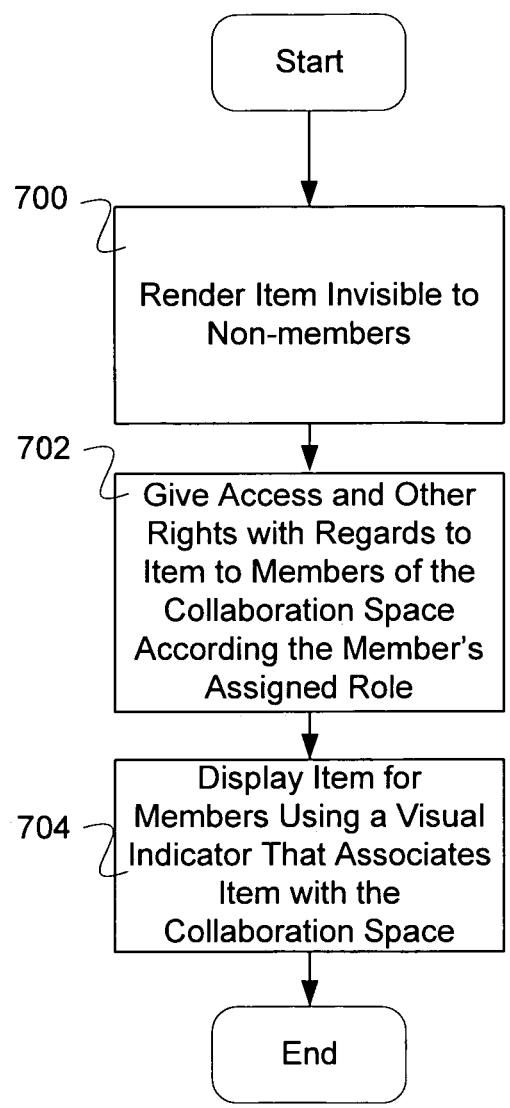
FIG. 7 is a flow diagram illustrating an embodiment of a process for placing an item under governance/control of a collaboration space.

FIG. 7 is a flow diagram illustrating an embodiment of a process for placing an item under governance/control of a collaboration space. In some embodiments, the process of FIG. 7 implements 602 of FIG. 6. In the example shown, in 700 the item is rendered invisible to non-members of the collaboration space. Content under the control of the collaboration space is not visible to non-member users whether in the collaboration space or in another space—for example, a non-collaboration folder, window, or other system or repository location. Content under the control of the collaboration space is also not visible when a non-member user searches or uses other applications to access content. In some embodiments, a content item under governance of a collaboration space is not visible to a user that is not a member of the collaboration space even if the user would otherwise have had the right and ability to access the content item within a body of managed content in which it is included, e.g., by virtue of the user's rights and privileges as defined by his/her role (e.g., position) and/or relationship to the content item (e.g., creator, reviewer, approver, etc.). In 702, access and other rights to access content items governed by the collaboration space are given to members of the collaboration space according to each respective member's assigned role. In some embodiments, access rights are checked by applications and system tools when accessing a content item and if the access rights are not granted—for example the user is a non-member of the collaboration space or the user is a member of the collaboration space that the content item is controlled/governed by but not one with the right to access that particular content item in a manner requested or attempted (e.g., view, read, modify, delete, etc.), then access is not provided. In 704, the item is displayed for members (or at least a subset thereof) using a visual indicator that associates the item with the collaboration space, e.g., one that indicates to a member that the item is under governance of (i.e., is associated exclusively with) the collaboration environment, as opposed to being a shared item also accessible by non-members. In various embodiments, the visual indicator is a variation of a standard icon (for example, a different color, shape, shading, or with an added feature, background, etc.), a different icon, or an icon with added text. In some embodiments, the visual indicator indicates the collaboration space that the content item is associated with. In some embodiments the visual indicator indicates that the content item is controlled by a collaboration space, but does not indicate which collaboration space the item is controlled by. For example, the visual indicator indicates that the content item is governed by the "current" collaboration space, or by some other collaboration space, or by no collaboration space.

Figure 8A:
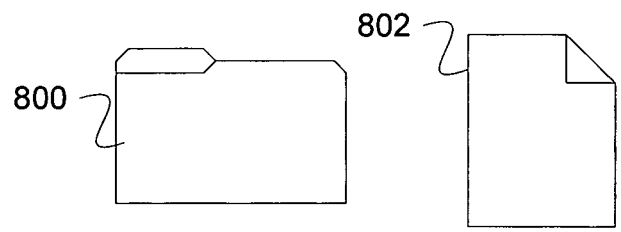
FIGS. 8A, 8B, and 8C illustrate content items and content folders in one embodiment.
Figure 8B:
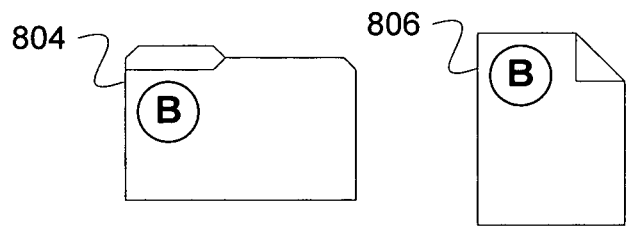
Figure 8C:
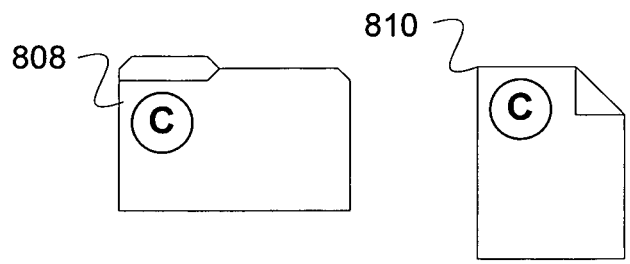

FIGS. 8A, 8B, and 8C illustrate content items and content folders in one embodiment. In the example shown in FIG. 8A, folder 800 and content item 802 are shared in the collaboration space or window and are not controlled by the collaboration space. In the example shown in FIG. 8B, folder 804 and content item 806 are controlled by collaboration space B. In the example shown in FIG. 8C, folder 808 and content item 810 are controlled by collaboration space C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for displaying a plurality of items of content to a user in icon form, comprising:
   determining that a first and a second content item in a set of content items comprising a body of managed content are to be displayed to the user in icon form;
   determining that the first content item in the set is a general content item that is not associated with any collaboration environment;
   determining that the second content item is a collaboration content item associated with at least a first collaboration environment of which the user is a member;
   incorporating, into an icon for the second content item determined to be associated with the first collaboration environment, a first visual indication that indicates the second content item is associated with the first collaboration environment and is not a general content item, wherein the first visual indication includes at least one addition to a standard icon used to represent general content items, and wherein the addition identifies the first collaboration environment;
   displaying the standard icon for the first content item, wherein the standard icon indicates that the first content item is a general content item not exclusively owned by any collaboration environment; and
   displaying the icon for the second content item that comprises the first visual indication indicating that the second content item is associated with the first collaboration environment.

2. A method as in claim 1, wherein the first visual indication further comprises a different icon to a standard icon associated with the content item.

3. A method as in claim 1, wherein the first visual indication further comprises a variation of an icon associated with the second content item.

4. A method as in claim 1, wherein the first visual indication depends on the first collaboration environment that the second content item is associated with.

5. A method as in claim 1, wherein the first visual indication depends on the first collaboration environment that the second content item is associated with and on rights the user has as a member of the first collaboration environment.

6. A method as in claim 1, further comprising in the event that another content item is associated with a second environment of which the user is not a member, providing visual indication that the other content item is associated with the second environment by providing no visual indication of the other content item to the user.

7. A method as in claim 1, further comprising in the event that another content item is associated with a second environment of which the user is not a member, providing visual indication that the other content item is associated with the second environment by providing no access to the other content item for an application that the user executes.

8. A method as in claim 1, further comprising in the event that another content item is associated with a second environment of which the user is not a member, providing visual indication that the other content item is associated with the second environment by providing visual indication that the other content item is not accessible to the user.

9. A method as in claim 1, wherein determining that the set of content items comprising the first and second items of content comprising a body of managed content are to be displayed to a user comprises receiving a search query to which the set of content items is responsive.

10. A method as in claim 1, wherein determining that the set of content items comprising the first and second items of content comprising a body of managed content are to be displayed to a user comprises receiving a browse request to a place where the set of content items resides.

11. A method as in claim 1, wherein determining that the set of content items comprising the first and second items of content comprising a body of managed content are to be displayed to a user comprises receiving a request to view content associated with the first collaboration environment.

12. A method as in claim 1, further comprising determining that the second content item is exclusively governed by the first collaboration environment, wherein the exclusive governance comprises complete control by the first collaboration space over at least one of the following: visibility of the second content item, access to the second content item, and user rights with respect to the second content item, and wherein the first visual indication further indicates that the second content item is associated with and governed by the first collaboration environment.

13. A method as in claim 1, further comprising determining that the second content item is associated with the first collaboration environment but is not exclusively governed by the first collaboration environment, and providing no visual indication that the content item is associated with the first collaboration environment.

14. A method as in claim 1, further comprising:
   in the event that the second content item is associated with the first collaboration environment and is exclusively governed by the first collaboration environment, providing the first visual indication; and
   in the event that the second content item is associated with the first collaboration environment but is not exclusively governed by the first collaboration environment, providing a different visual indication.

15. A computer program product for displaying a plurality of items of content to a user in icon form, the computer program product being embodied in a non-transitory computer readable medium and comprising computer instructions for:
- determining that a first and a second content item in a set of content items comprising a body of managed content are to be displayed to the user in icon form;
- determining that the first content item in the set is a general content item that is not associated with any collaboration environment;
- determining that the second content item is a collaboration content item associated with at least a first collaboration environment of which the user is a member;
- incorporating, into an icon for the second content item determined to be associated with the first collaboration environment, a first visual indication that indicates the second content item is associated with the first collaboration environment and is not a general content item, wherein the first visual indication includes at least one addition to a standard icon used to represent general content items, and wherein the addition identifies the first collaboration environment;
- displaying the standard icon for the first content item, wherein the standard icon indicates that the first content item is a general content item not exclusively owned by any collaboration environment; and
- displaying the icon for the second content item that comprises the first visual indication indicating that the second content item is associated with the first collaboration environment.

16. A system for displaying a plurality of items of content to a user in icon form, comprising:
- a processor; and
- a memory coupled with the processor, wherein the memory is configured to provide the processor with instructions which when executed cause the processor to:
  - determine that a first and a second content item in a set of content items comprising a body of managed content are to be displayed to the user in icon form;
  - determine that the first content item in the set is a general content item that is not associated with any collaboration environment;
  - determine that the second content item is a collaboration content item associated with at least a first collaboration environment of which the user is a member;
  - incorporate, into an icon for the second content item determined to be associated with the first collaboration environment, a first visual indication that indicates the second content item is associated with the first collaboration environment and is not a general content item, wherein the first visual indication includes at least one addition to a standard icon used to represent general content items, and wherein the addition identifies the first collaboration environment;
  - display the standard icon for the first content item, wherein the standard icon indicates that the first content item is a general content item not exclusively owned by any collaboration environment; and
  - display the icon for the second content item that comprises the first visual indication indicating that the second content item is associated with the first collaboration environment.

17. A method as in claim 1, further comprising incorporating, into an icon for each collaboration content item determined to be owned exclusively by a second collaboration environment, a second visual indication that indicates the collaboration content item is associated with the second environment, and that the second content item is not a general content item and not a content item associated with the first collaboration environment.

* * * * *